United States Patent
Landrichter

(10) Patent No.: US 6,565,285 B1
(45) Date of Patent: May 20, 2003

(54) METHOD AND DEVICE FOR LAYING AN UNDERGROUND DUCT MADE OF A PLASTIC MATERIAL

(76) Inventor: Wolfgang Landrichter, Dörfl 3, Vöcklabruck (AT), A-4840

( * ) Notice: Subject to any disclaimer, the term of this patent is extended or adjusted under 35 U.S.C. 154(b) by 0 days.

(21) Appl. No.: 09/743,886

(22) PCT Filed: Jun. 17, 1999

(86) PCT No.: PCT/AT99/00157
§ 371 (c)(1),
(2), (4) Date: Feb. 26, 2001

(87) PCT Pub. No.: WO00/04314
PCT Pub. Date: Jan. 27, 2000

(30) Foreign Application Priority Data

Jul. 17, 1998 (AT) .............................................. 1236/98

(51) Int. Cl.[7] ................................................. F16L 1/038
(52) U.S. Cl. ........................ 405/155; 405/156; 405/184
(58) Field of Search ................................. 405/155, 156, 405/154.1, 184, 184.1, 184.2

(56) References Cited

U.S. PATENT DOCUMENTS

| 3,349,568 | A | | 10/1967 | Smith et al. |
| 4,088,720 | A | * | 5/1978 | Kostvlev et al. ............. 405/155 |
| 4,148,193 | A | * | 4/1979 | Mottes ........................ 405/155 |
| 4,652,174 | A | | 3/1987 | Cornely et al. |
| 4,915,541 | A | | 4/1990 | Thompson et al. |
| 4,956,032 | A | * | 9/1990 | Hahn et al. ................. 405/155 |

FOREIGN PATENT DOCUMENTS

| DE | 33 17 025 | 8/1984 |
| DE | 38 36 440 | 5/1990 |

* cited by examiner

Primary Examiner—Frederick L. Lagman
(74) Attorney, Agent, or Firm—Collard & Roe, P.C.

(57) ABSTRACT

For laying synthetic underground piping (1) a ground channel (2) is first bored and the piping (1) is introduced into the ground channel (2). To facilitate laying an underground pipe length particularly effectively, the pipe length (1) comprising a hardening synthetic mass is manufactured at the same time as it is introduced into the ground channel (2) by the prepared synthetic mass being formed continuously inside the ground channel (2) as a run of piping (3) and left to harden. A reactor (4) which can be drawn through the ground channel (2) and comprising a front reactor drum (5) and a rear double-sheathed calibrating cylinder (6) is provided for this purpose, whereby reactor drum (5) and calibrating cylinder (6) are arranged coaxially to one another and relatively rotatably and lines (8) for supply of constituents terminate in the reactor chamber (51) of the reactor drum (5) and the reactor chamber (51) is connected by way of a nozzle ring (12) to the calibrating space, open from below and formed from the double mantle (10) of the calibrating cylinder (6).

5 Claims, 3 Drawing Sheets

METHOD AND DEVICE FOR LAYING AN UNDERGROUND DUCT MADE OF A PLASTIC MATERIAL

CROSS REFERENCE TO RELATED APPLICATIONS

Figure 1:
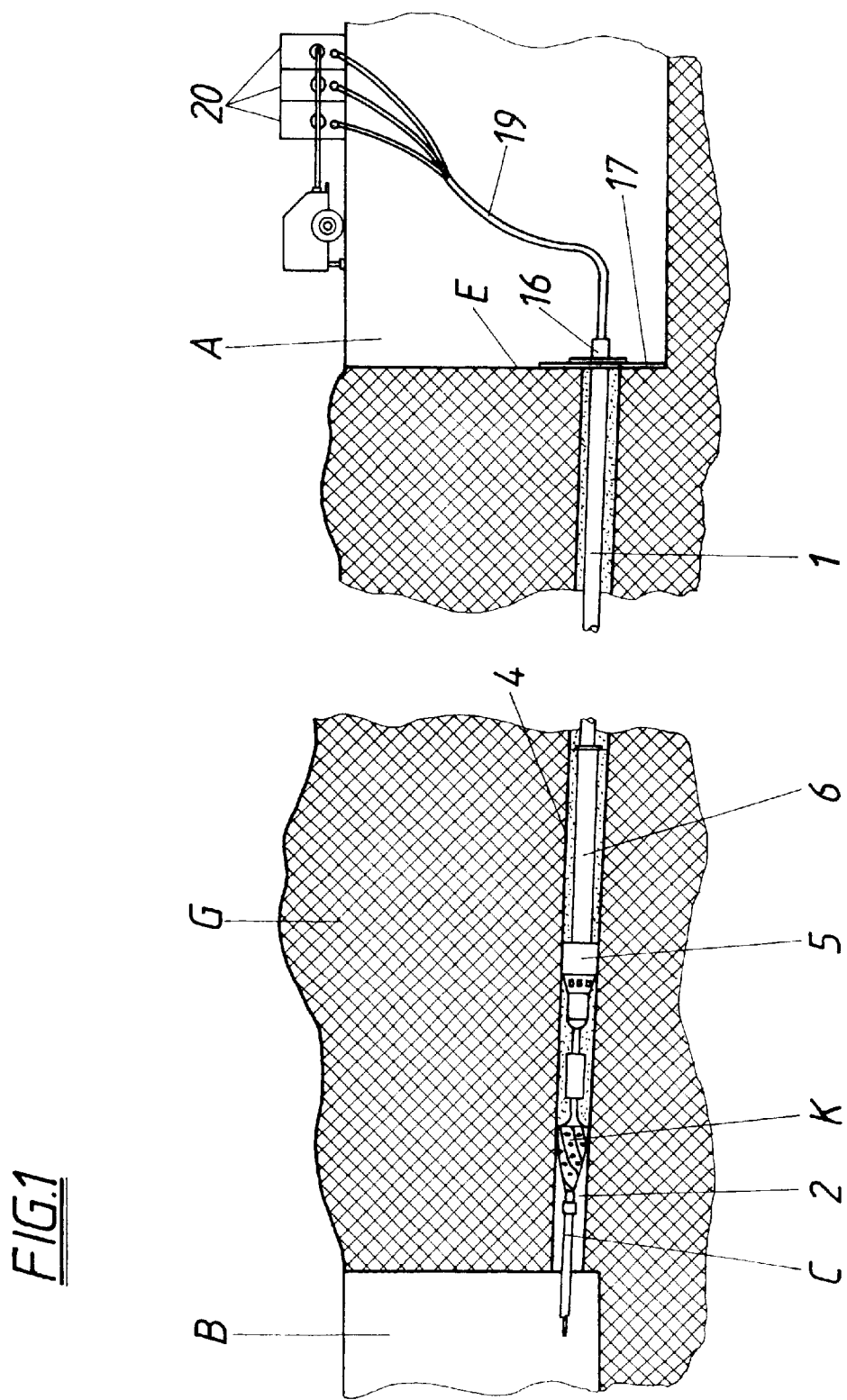

Applicant claims priority under 35 U.S.C. §119 of Austrian Application No. A 1236/98 filed Jul. 17, 1998. Applicant also claims priority under 35 U.S.C. §365 of PCT/AT99/00157 filed Jun. 17, 1999. The international application under PCT article 21 (2) was not published in English.

TECHNICAL FIELD

The present invention relates to a process for laying synthetic underground piping, according to which a ground channel is first bored and the piping introduced thereinto, as well as apparatus for carrying this process into effect.

PRIOR ART

There are various boring procedures, so-called horizontal boring procedures, already known for producing ground channels for subterranean laying of piping, wherein primarily bore flushing and a course-controlled bore head are employed which permit boring of corresponding ground channels along a piping course predetermined by a plan, with adequate accuracy of direction. These processes have thoroughly proven themselves, since they enable the laying of supply and sanitation piping in underground procedures with a minimum of necessary excavation work. The actual laying of the pipes is achieved by drawing a run of piping, made up of lengths of pipe, during the drawing procedure into the ground channel, which proves relatively expensive and time-consuming and requires large handling pits and surfaces. Furthermore, the annular gap between the external pipe length surface and the internal ground channel surface must be selected large enough depending on connection technology of the individual pipe lengths and the preset laying lengths with the associated friction forces, by means of which the ground channel diameter is to be up to twice as great as the external diameter of the run of piping. This again means additional load with respect to excavation and discharge of material, ground flush quantities and propping of ground channels, as well as logistical dumping-related requirements and the like. In addition, the connection impacts of the pipe lengths always signify an increased risk of corrosion and fault point.

DESCRIPTION OF THE INVENTION

The object of the invention is therefore to indicate a process of the type described at the outset which permits efficient laying of underground piping, extensively disconnects fault points created by connection impact and also assists in minimising and variably shaping handling pits and surfaces, avoiding pipe insertion paths, reducing necessary transport and warehousing services and minimising as far as possible the demand for special dump sites for the discharged material and bore flushing, as well as required quantities of support fluid and the like. Also, an effective apparatus for carrying the process into effect is to be created.

The present invention solves this task by the piping, comprising a hardening synthetic mass, being manufactured at the same time as it is being introduced into the ground channel, in that the prepared synthetic mass is continuously formed inside the ground channel as a run of piping and left to harden. Accordingly, the run of piping is formed directly in the ground channel itself, resulting in a continuous pipe free of pipe lengths and without any insertion procedure necessary. For this purpose, the synthetic mass, which can be hardened by age by use of, for example, synthetic resin by mixing the individual constituents such as epoxy vinyl ester resin, reinforcement agent, MEK peroxide as catalyst and cobalt octoate as well as dimethyl aniline as activator, required for manufacturing the pipe only needs to be prepared and then pressed or formed and left to harden into the run of piping inside the ground channel. The tanks provided for holding the constituents can be erected at any suitable site, from where the constituents are conveyed by way of flexible pressure hoses without difficulty to the respective processing site, such that expense and space requirements are minimal. The run of piping being produced continuously inside the ground channel does not contribute any fault points caused by impact and the diameter of the ground channel must be only slightly greater than the external diameter of the run of piping.

It is effective if the synthetic mass inside the ground channel is prepared by intermixing of individual separately supplied constituents, such that there is no danger of premature incipient hardening of the synthetic mass and additional space requirement for external preparation plants is also avoided.

In order to be able to carry out this laying process efficiently, a reactor which can be drawn through the ground channel, comprising a front reactor drum and a rear double-sheathed calibrating cylinder is provided, whereby reactor drum and calibrating cylinder are arranged coaxially to one another and relatively rotatably and lines for supply of constituents terminate in the reactor chamber of the reactor drum and the reactor chamber is connected by way of a nozzle ring to the calibrating space, open from below and formed from the double mantle of the calibrating cylinder. For laying the piping the reactor is drawn through the pre-fabricated ground channel, for which purpose apparatus from horizontal boring technology, such as drill strings and back reamer and the like, is employed. As the reactor is being drawn through, the constituents for preparing the synthetic mass are introduced into the reactor chamber of the front reactor drum by means of appropriate supply lines, where they are mixed into a hardenable synthetic mass which then penetrates into the calibrating space of the calibrating cylinder by way of the nozzle ring. Here in the calibrating space the synthetic mass is formed continuously into the run of piping which is extruded out behind the calibrating cylinder while the reactor is being drawn through the ground channel and hardens into the piping inside the ground channel. By means of the relative torsional capacity of the reactor drum relative to the calibrating cylinder, the calibrating cylinder itself remains torsional inside the ground channel, despite rotation of the reactor drum, such that there is no twisting of the run of piping.

To improve preparation of the synthetic mass and to achieve thorough mixing of the supplied synthetic constituents, the reactor drum, which rotates as the reactor is being drawn through the ground channel, exhibits mixing tools projecting into the reactor chamber.

If the reactor drum exhibits guide runners projecting radially outwards or a guide ring, when the reactor is being drawn through the ground channel, this creates a centering guide for the reactor drum and the attached calibrating cylinder, so that the drawn out run of piping is laid by forming of the most uniform possible annular gap opposite the ground channel wall in the ground channel itself, whereby the annular gap can be filled with flushing or support liquid.

According to another embodiment of the invention an end piece which can be joined detachably to the calibrating cylinder belongs to the reactor. This end piece sealing off the calibrating space and exhibiting a ventilation device can be anchored torsionally in the inlet vicinity of the ground channel. The end piece facilitates initial forming of the run of piping, since it initially seals off the calibrating space and can be anchored torsionally at the ground channel inlet as the reactor is being inserted into the ground channel and at the correct height. The synthetic mass can now be prepared by impacting the reactor chamber with the synthetic constituents and pressed by raising the admission pressure in the calibrating space until the appearance of the synthetic mass from the ventilation device signals that the calibrating space is completely filled with synthetic mass. The connection between the end piece and the reactor can now be broken and the reactor drawn through the ground channel, whereby the run of piping, which has its beginning stuck in the end piece and remains torsionally anchored by way of the end piece, is extruded continuously, securely preventing the run of piping from twisting. Also, the height of the run of piping or of the pipe length required according to project can be adjusted geodetically precisely by means of the position of the end piece.

In order to be able to influence the forming of the run of piping or the hardening process the double mantle of the calibrating cylinder can be heated, by which the synthetic mass extruded into the run of piping by way of the double mantle can be heat-treated. In the process, the double mantle can be provided inside and/or outside and along the entire length or only in part sections with suitable heating devices.

It is important here that any heat transfer from the calibrating cylinder to the reactor drum is prevented by corresponding insulation measures.

BRIEF DESCRIPTION OF THE DIAGRAM

Figure 2:
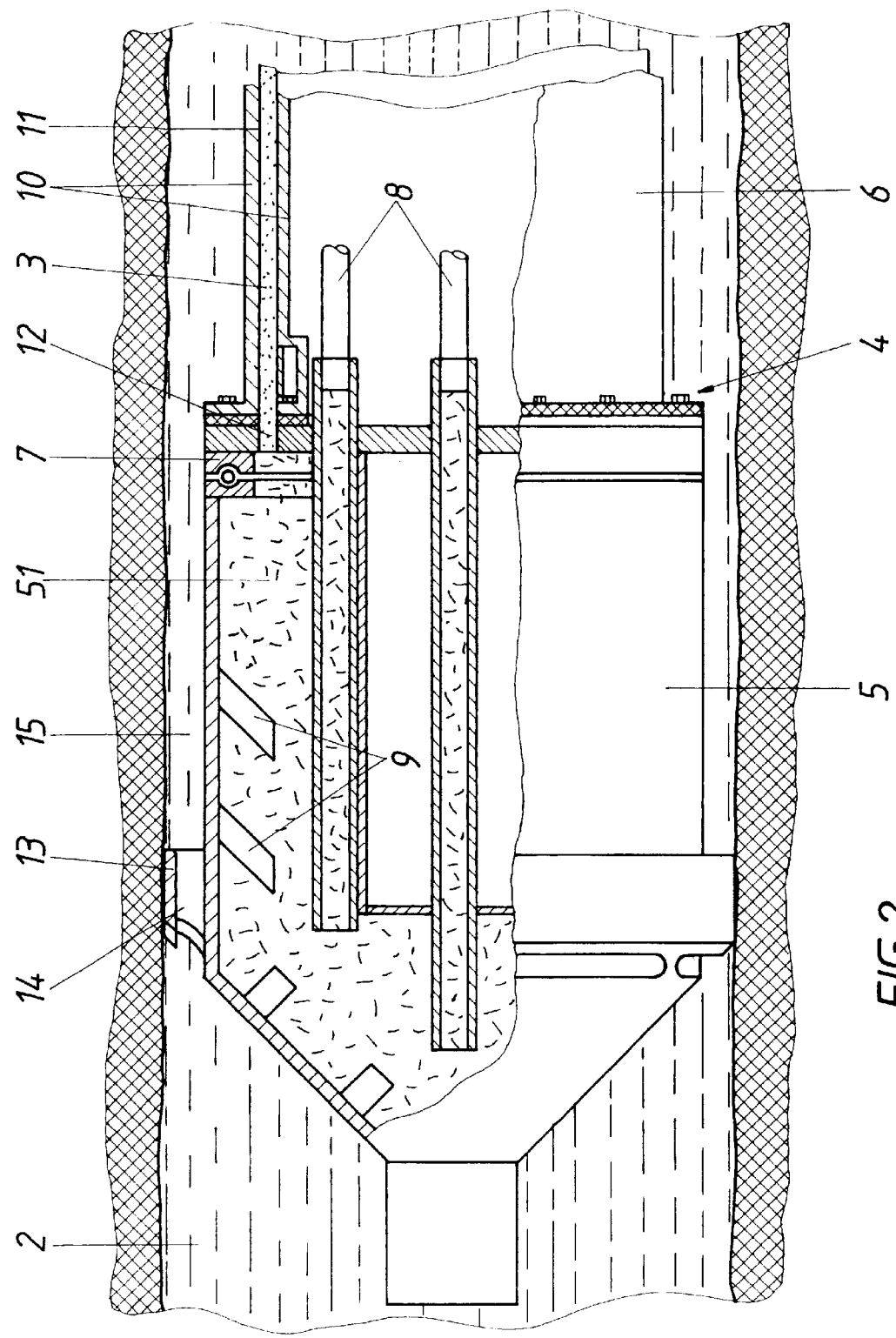
Figure 3:
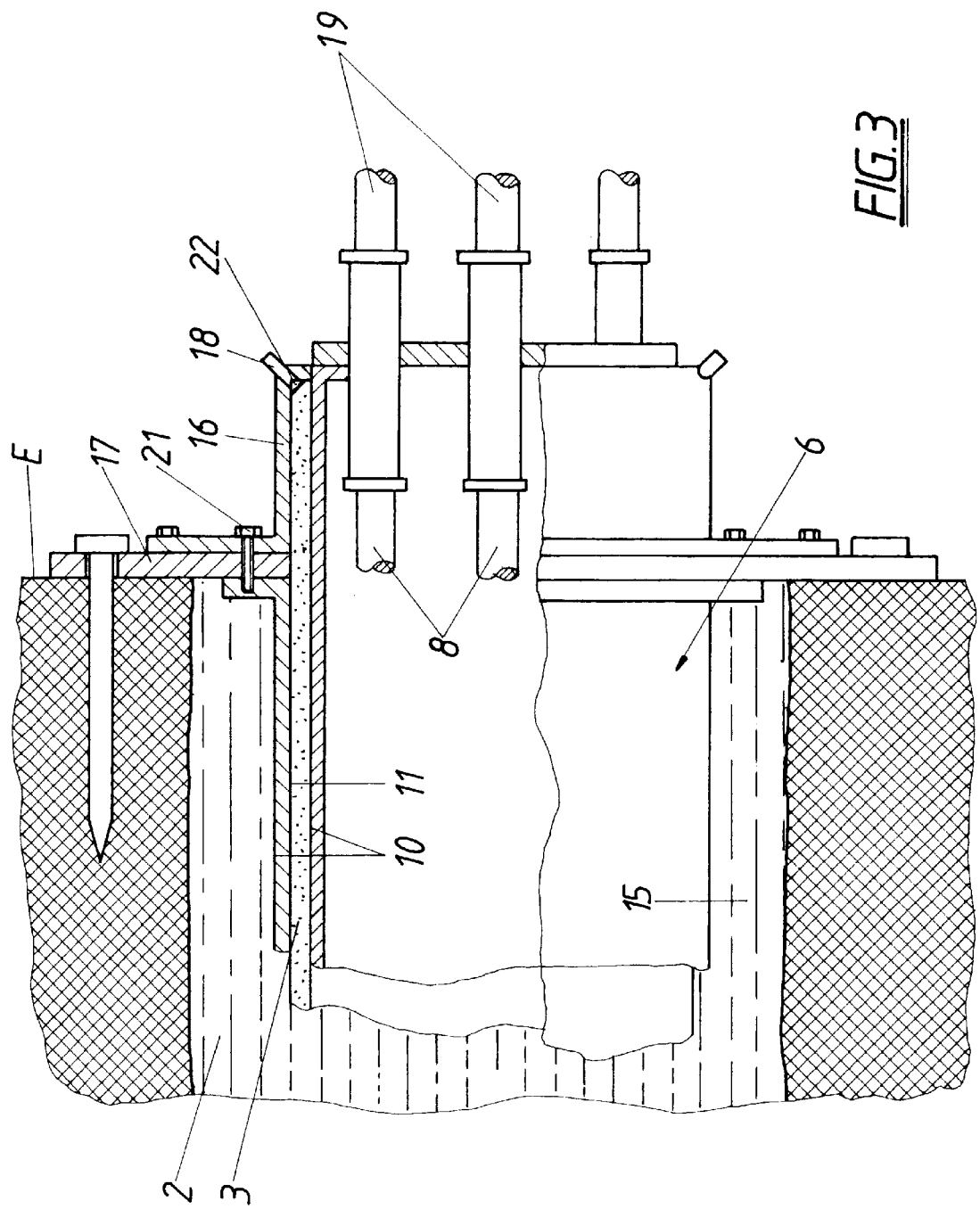

The diagram illustrates the inventive object purely schematically, in which:

FIG. 1 shows apparatus according to the present invention for laying an underground length of pipe in a system diagram, FIG. 2 shows the reactor of the apparatus according to the present invention in axial section on a larger scale, and FIG. 3 shows a part of the reactor in the starting position prior to laying the pipe lengths, also in axial section.

METHOD FOR CARRYING OUT THE INVENTION

To be able to effectively lay an underground pipe length 1, a ground channel 2 is first bored along the pipe course, which is bored for example in terrain G from a start pit A to a target pit B using a controlled horizontal flush boring process or a flush-assisted horizontal boring process. After the ground channel is prepared pipe length 1 is then introduced into ground channel 2, for which purpose the pipe length comprising a hardening synthetic mass is manufactured at the same time as it is introduced into the ground channel by the prepared synthetic mass being formed continuously inside the ground channel as a run of piping 3 and left to harden.

A reactor 4 is provided for this purpose, which is drawn from start pit A through ground channel 2 to target pit B by the available boring apparatus associated with producing the ground channel, for example boring strings C and expanding head K. Said reactor 4 is composed of a front reactor drum 5 and a rear calibrating cylinder 6, whereby reactor drum 5 and calibrating cylinder 6 are arranged coaxially and relatively rotatably by way of a positioning ring 7, but connected to one another by tension, so that when reactor 5 is drawn through ground channel 2, on the basis of rotation of the boring strings not only expanding head K but also along with it reactor drum 3, though not calibrating cylinder 6, are rotated.

Reactor drum 5 presents a reactor chamber 51 in which supply lines 8 for supplying synthetic constituents terminate, and is equipped with mixing tools 9 projecting into the reactor chamber. Calibrating cylinder 6 presents a preferably heatable double mantle 10 for forming a calibrating space 11 which connects to reactor chamber 51 by means of a nozzle ring 12. When the constituents required for preparing the synthetic mass for manufacturing the pipe lengths are introduced into reactor chamber 51, said constituents can be mixed by mixing tools 9 and prepared for the desired synthetic mass. Depending on further pressurisation this mass is then pressed via lines 8 through nozzle ring 12 into calibrating space 11 where it is formed into run of piping 3 and hardens while the reactor is being drawn through the ground channel as it exits from the calibrating space, resulting in a length of pipe 1 lying in ground channel 2.

For guiding reactor 4 relative to ground channel 2 reactor drum 5 is fitted with an external guide ring 13 which the reactor uses to glide along the ground channel walls, whereby flushing openings 14 are left open inside the ring so that flushing liquid, which has filled the ground channel by way of the expanding head or the like, can penetrate into annular space 15 between run of piping 3 and ground channel 2.

At the commencement of the pipe laying an end piece 16, which seals off calibrating space 11 and can be anchored torsionally in inlet vicinity E of the ground channel by way of an annular flange 17, is joined detachably to the free end of the calibrating cylinder. Said end piece 16 exhibits a ventilation device 18 as a type of air lock for the calibrating space of the calibrating cylinder. If the reactor is assembled and coupled to expanding head K it can be inserted into the ground channel as far as the stop on annular flange 17 on the front wall of start pit A. The annular flange is now fastened torsionally by stakes in inlet vicinity E and at a corresponding height and lines 8 can be connected by means of pressure hoses 19 to the prepared pressure tanks 20 containing the synthetic constituents. Through admission of pressure from these tanks these constituents can be pressed into reactor chamber 51 by way of pressure hoses 19 and supply lines 8, where they are mixed by rotation of the drum and penetrate calibrating space 11 of calibrating cylinder 6. As soon as the synthetic mass exits from ventilation device 18, the calibrating space is completely filled with the synthetic mass, at which point end piece 16 is freed from the calibrating cylinder, by opening of screw fitting 21, for example, and the entire reactor is drawn through the ground channel as the run of piping is being formed. In the process, the end piece fixes the resulting run of piping torsionally relative to the ground channel by means of gusset plates 22 or similar, so that there is no twisting, and pipe length 1 is introduced continuously into ground channel 2 in one procedure.

What is claimed is:

1. A process for laying synthetic underground piping, according to which a ground channel is bored and the piping introduced thereinto, whereby the piping, comprising a hardening synthetic mass, is manufactured at the same time as it is being introduced into the ground channel, in that the prepared synthetic mass is continuously formed inside the ground channel as a run of piping and left to harden, characterised in that the ground channel is first bored and then the pipe length is introduced into the prepared ground channel and in that the run of piping is formed inside the ground channel, keeping clear an annular gap relative to the ground channel walls for backfilling with support liquid.

2. Apparatus for carrying out the process as claimed in claim 1, chaiacterised in that it comprises a reactor (4), which can be drawn through the ground channel (2) and comprises a front reactor drum (5) and a rear double-sheathed calibrating cylinder (6), the reactor drum (5) and calibrating cylinder (6) being arranged coaxially to one another and being rotatable relative to each other, and lines (8) for supply of constituents terminate in a reactor chamber (51) of the reactor drum (5), and the reactor chamber (51) is connected by way of a nozzle ring (12) to a calibrating space (11) open at an end remote from the reaction chamber and defined by a double mantle (10) of the calibrating cylinder (6).

3. Apparatus as claimed in claim 2, characterised in that the reactor drum (5), which rotates as the reactor (4) is being drawn through the ground channel (2), comprises mixing tools (9) projecting into the reactor chamber (51).

4. Apparatus as claimed in claim 2, characterised in that the reactor comprises an end piece (16) which can be joined detachably to the calibrating cylinder (6), said end piece (16) sealing off the calibrating space (11) and comprising a ventilation device (18) which can be anchored torsionally in the inlet vicinity (E) of the ground channel (2).

5. Apparatus as claimed in claim 2, characterised in that the double mantle (10) of the calibrating cylinder (6) can be heated with insulation of the reactor drum (5).

* * * * *